United States Patent
Horen

(10) Patent No.: US 10,599,654 B2
(45) Date of Patent: Mar. 24, 2020

(54) METHOD AND SYSTEM FOR DETERMINING UNIQUE EVENTS FROM A STREAM OF EVENTS

(71) Applicant: salesforce.com, inc., San Francisco, CA (US)

(72) Inventor: Gary Horen, Seattle, WA (US)

(73) Assignee: salesforce.com, inc., San Francisco, CA (US)

( * ) Notice: Subject to any disclaimer, the term of this patent is extended or adjusted under 35 U.S.C. 154(b) by 383 days.

(21) Appl. No.: 15/796,694

(22) Filed: Oct. 27, 2017

(65) Prior Publication Data

US 2018/0357285 A1 Dec. 13, 2018

Related U.S. Application Data

(60) Provisional application No. 62/518,498, filed on Jun. 12, 2017.

(51) Int. Cl.
*G06F 16/22* (2019.01)
*G06F 16/2455* (2019.01)
*G06F 16/27* (2019.01)
*G06Q 10/10* (2012.01)
*G06Q 50/00* (2012.01)

(52) U.S. Cl.
CPC .... *G06F 16/24568* (2019.01); *G06F 16/2282* (2019.01); *G06F 16/27* (2019.01); *G06Q 10/10* (2013.01); *G06Q 50/01* (2013.01)

(58) Field of Classification Search
CPC .............. G06F 16/24568; G06F 16/27; G06F 16/2282; G06F 16/273; G06F 16/275; G06F 16/278; G06F 19/328; G06Q 10/10; G06Q 50/01
See application file for complete search history.

(56) References Cited

U.S. PATENT DOCUMENTS

| | | | | |
|---|---|---|---|---|
| 9,576,020 | B1 * | 2/2017 | Patterson | ............... G06Q 50/01 |
| 10,521,747 | B2 * | 12/2019 | Warner | ............. G06Q 10/0633 |
| 2014/0280134 | A1 | 9/2014 | Horen et al. | |
| 2014/0280329 | A1 | 9/2014 | Beechuk et al. | |
| 2015/0156213 | A1 * | 6/2015 | Baker | ................. H04L 63/1416 726/23 |

(Continued)

FOREIGN PATENT DOCUMENTS

JP 2018018550 A 2/2018

OTHER PUBLICATIONS

Apache HBase Team, Apache HBase (TM) Reference Guide, Jan. 2020, Apache HBase, pp. 3-831 (Year: 2020).*

(Continued)

*Primary Examiner* — Jorge A Casanova
(74) *Attorney, Agent, or Firm* — Nicholson de vos Webster & Elliott LLP

(57) ABSTRACT

A method and a system for determining unique counts of events from a stream of events are described. One or more sets of events are defined. A set is defined based on one or more parameters including a set type and zero or more set qualifiers. When an event occurs information related to the event is obtained and used to create a Hbase row key. The Hbase row key includes the set type, associated set qualifiers and a set member qualifier. The Hbase row key is added to the Hbase table when the Hbase row key is not already included in the Hbase table.

18 Claims, 12 Drawing Sheets

(56) References Cited

U.S. PATENT DOCUMENTS

| | | | | |
|---|---|---|---|---|
| 2015/0220080 | A1* | 8/2015 | Nixon | G05B 19/418 |
| | | | | 700/19 |
| 2015/0254330 | A1* | 9/2015 | Chan | G06F 16/285 |
| | | | | 707/613 |
| 2015/0286969 | A1* | 10/2015 | Warner | G06Q 10/0633 |
| | | | | 705/7.27 |
| 2016/0085809 | A1* | 3/2016 | de Castro Alves | |
| | | | | G06F 16/24568 |
| | | | | 707/736 |
| 2016/0085810 | A1* | 3/2016 | de Castro Alves | |
| | | | | G06F 16/24568 |
| | | | | 707/752 |
| 2017/0024912 | A1* | 1/2017 | de Castro Alves | G06F 16/26 |
| 2018/0357285 | A1 | 12/2018 | Horen | |
| 2019/0102467 | A1 | 4/2019 | Horen et al. | |
| 2019/0104189 | A1 | 4/2019 | Horen | |
| 2019/0163784 | A1 | 5/2019 | Horen | |

OTHER PUBLICATIONS

George, HBase: The Definitive Guide, Sep. 2011, O'Reilly, First Edition, pp. 1-522 (Year: 2011).*

Joseph M. Hellerstein et al., "Architecture of a Database System," Foundations and Trends in Databases, vol. 1, No. 2, 2007, pp. 141-259.

Joseph M. Hellerstein et al., "Anatomy of a Database System," Readings in Database Systems, Fourth Edition, The MIT Press, 2005, pp. 42-95.

Jan Van Den Bussche et al., "Translating SQL into the Relational Algebra," retrieved from: https://cs.ulb.ac.be/public/_media/teaching/infoh417/sql2alg_eng.pdf Oct. 2016, pp. 1-19.

Michael Kifer et al., "Database Systems: An Application-Oriented Approach," Complete Version, Second Edition, Pearson Addison Wesley, ISBN-13: 978-0321268457, Mar. 26, 2005, parts 1-6 (1,245 pages).

* cited by examiner

| SET TYPE 614 | GROUP ID 602 | TIME INDICATOR(S) 604 | SET MEMBER QUALIFIER 620 |
|---|---|---|---|
| VIEWERS OF A FEED ITEM | MY GROUP | N/A | JOE |
| VIEWERS OF A FEED ITEM | MY GROUP | N/A | SUE |
| VIEWERS OF A FEED ITEM | YOUR GROUP | N/A | JIM |
| VIEWERS OF A FEED ITEM | YOUR GROUP | N/A | CATHY |
| VIEWERS OF A FEED ITEM | YOUR GROUP | N/A | WILL |
| GROUPS CREATED LAST WEEK | N/A | TIMESTAMP 1 | CAT GROUP |
| GROUPS CREATED LAST WEEK | N/A | TIMESTAMP 2 | DOG GROUP |

FIGURE 6

```
SELECT COUNT (*) FROM set_table
WHERE set type = 'viewers of a feed item' AND group ID =
'my group'
```

FIGURE 8

METHOD AND SYSTEM FOR DETERMINING UNIQUE EVENTS FROM A STREAM OF EVENTS

CROSS-REFERENCE TO RELATED APPLICATIONS

This application claims the benefit of U.S. Provisional Application No. 62/518,498, filed Jun. 12, 2017, which is hereby incorporated by reference.

TECHNICAL FIELD

One or more implementations relate to the determination of unique events from a stream of events.

BACKGROUND

A social networking service is an online service, platform, or site that focuses on facilitating the building of social networks or social relations among people who may share interests, activities, real-life connections, or backgrounds. A social network service consists of a representation or profile for each user, his/her social links, and a variety of additional services. Most social network services are web-based and provide a way for users to interact over the internet, such as e-mail and instant messaging. Social networking sites allow users to share ideas, activities, events, and interests within their individual networks. Popular social networking services include Facebook™, Google+™, Twitter™, LinkedIn™, YouTube™, Foursquare™, Yelp™, Expedia™, MySpace™, and Flickr™. An individual may use many social networking sites, each which enable the individual to interact with other users via countless social network communications, or network feeds. A social networking system can be an enterprise social networking system used within an enterprise or a public social networking system open to the public. Enterprise social networking systems are increasingly becoming a common way to facilitate communication among people, any of whom can be recognized as users of a social networking system.

Several types of events can occur within the social network. The events can be related to a feed item of a social networking feed or to any other changes within the social network. For example, the events can be actions performed by one or more users on a feed item, such as reading a feed item, posting a feed item, commenting on a feed item, or indicating a personal preference such as "likes" and "dislikes," updates to a user's status, uploaded files, and user-submitted hyperlinks to social network data or other network data such as various documents and/or web pages on the Internet. In a social network feed several events may occur in relation to one or more feed items. In another example, the events can be items on which an action is performed, such as a feed item that is commented on, read, deleted, etc. In another example, the events can represent the creation of new items or entities in the social network, such as the creation of a group, a feed item, a user, etc. Other examples of changes or updates within the social network that occur at a given time can be considered an event.

Determining the number of unique events that occur during a period of time is challenging as the same event can occur several times during that period. For example, attempting to determine the unique number of users that performed an action on a feed item during an interval of time will have a large performance cost, as each user can perform the same action several times during that interval of time.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 6 illustrates an exemplary set table in accordance with one implementation.

FIG. 8 illustrates an exemplary query that can be used to determine the number of unique viewers of a feed item according to one implementation.

DETAILED DESCRIPTION

The following description describes methods and apparatus for the determination of unique events from a stream of events.

Systems and methods are provided that enable determination of unique events from a stream of events. In the following description, while implementations will be described with reference to social networks and streams of events of a social network, other implementations can be considered without departing from the scope of the present invention. The solution presented herein can be used to determine unique counts of events that occur in a set of events, where the same events can occur repeatedly. For example, the solution can be used to determine unique counts of visitors to a website, unique counts of visitors that comment on a post in a blog, etc.

Figure 1:
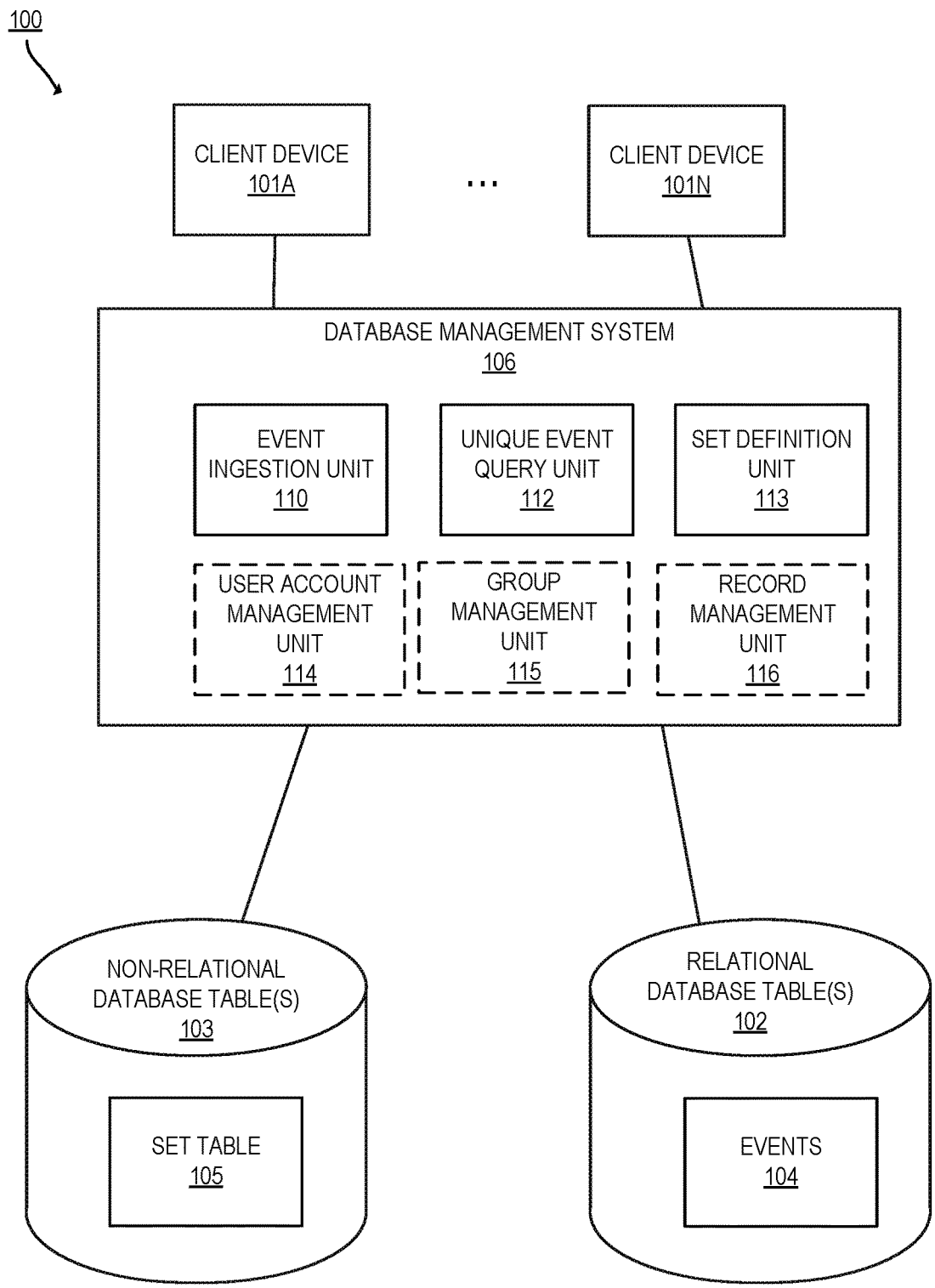
FIG. 1 illustrates a block diagram of an exemplary environment in which a database management system can be used according to one implementation.

FIG. 1 illustrates a block diagram of an exemplary environment in which a database management system can be used according to one implementation. The environment 100 includes client devices 101A-N, the database management system 106, a relational database system 102, and non-relational database system 103. The environment 100 enables users to access through the client devices 101A-N one or more services that are offered through the database management system 106. In some implementations, the services include a social networking service. In these implementations, the social networking service enables the users of the client devices 101A-N to communicate with one another, view and share updates regarding cases, accounts, or opportunities, etc. In other implementations, other services may be offered. The various components of the environment 100 may be part of a network (not illustrated) that couples the components to one another. For example, the network can be any one or any combination of a LAN (local area network), WAN (wide area network), telephone network, wireless network, point-to-point network, star network, token ring network, hub network, or other appropriate configuration. The network can include a TCP/IP (Transfer Control Protocol and Internet Protocol) network, such as the global internetwork of networks often referred to as the "Internet" with a capital "I." While the Internet is used as an example herein, it should be understood that the networks that the present implementations might use are not so limited.

The client devices 101A-N allow users of the database management system to access the service(s) and determine unique counts of events that occur within the system. The client devices 101A-N are electronic devices (e.g., a desktop personal computer, laptop, workstation, smartphone, palm top, mobile phone, tablets, gaming system, set-top box, or any wireless access protocol (WAP) enabled device etc.) that are capable of accessing network resources (e.g., they include software such as client network applications (e.g., web browsers, mobile applications, etc.) that are capable of accessing network resources) and connect to the database management system 106 for using the social networking service and requesting unique counts of events that occur within the database management system. The client devices 101A-N may be coupled to the database management system 106 through the network (not illustrated).

In one exemplary implementation, a client device may run an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the service offered through the database management system 106) of the client device to access, process and view information, pages and applications available to it from the database management system 106 over the network.

The database management system 106 implements an on-demand database service, platform, or site that focuses on storing data and providing services related to the stored data to the users of the client devices 101A-N. In some implementations, the database management system 106 facilitates the building of social networks or social relations among people who may share interests, activities, real-life connections, or backgrounds. The database management system 106 includes an event ingestion unit 110, a unique events query unit 112, and a set definition unit 113. The database management system 106 may include one or more other components for offering the service(s) to the users of the client devices 101A-N. These additional components are not illustrated to allow for ease of understanding of the present implementations. For example, the database management system 106 may include a user account management unit 114, a group management unit 115, and a record management unit 116.

Several events can occur in the database management system 106. Several types of events can occur within the database management system 106. An event can be any type of activity that occurs in the database management system 106 such as an update to an existing entry of the database management system 106 or creation of a new entry. For example, when the service offered is a social networking service, the events can be related to activities of users and/or new entities created in the social networking service. When the social networking service enables users to view/edit feed items of a social networking feed, changes to a feed item of the feed can represent different types of events that can occur in the system 106. For example, the events can be actions performed by one or more users on a feed item, such as reading a feed item, posting a feed item, commenting on a feed item, or indicating a personal preference such as "likes" and "dislikes," updates to a user's status, uploaded files, and user-submitted hyperlinks to social network data or other network data such as various documents and/or web pages on the Internet. In another example, the events can be items on which an action is performed, such as a feed item that is commented on, read, deleted, etc. In another example, the events can represent the creation of new items or entities in the social network, such as the creation of a group, a feed item, a user, etc. Typically the same event can occur several times during a period of time. For example, a user can view a feed item several times, a group and/or other entity can be updated/edited several times by one or more users.

A user and/or an administrator of the database management system 106 can be interested in obtaining different information regarding the events (i.e., activity) that occur within the system. The following detailed description presents a method and a system for determining unique counts of events from a stream of events. The events represent activities and actions that occur within the database management system 106. One or more sets of events are defined. For example, a user or an administrator of the database management system 106 is enabled to use the set definition unit 113 to define a set. A set is defined based on one or more parameters including a set type and zero or more set qualifiers that provide further information with regards to the events. When an event occurs information related to the event is obtained. The event ingestion unit 110 receives the event and determines one or more values of qualifiers that relate to the event. The information (e.g., the values of the set qualifiers) is used to create a key of an hbase table of events. The hbase table of events includes at each row a key where each key represents a unique set member from a set of events. The key includes the set type, associated qualifiers and an identification of the unique member represented by the event. The event ingestion unit 110 adds the event as a row of the hbase table when it is not already present in the hbase table ensuring that only a single occurrence of the event is added to hbase table.

In the following description a set of events for which the number of unique events is to be determined is defined by the set type and optional additional qualifiers that further define the set of events. The set definition unit 113 is used to define a set of events as defined by the set type and the additional qualifiers. A set type refers to the type of events for which unique counts are to be determined. As a first example, the set type can be "users performing a given action" in the system, such as "users "liking" a feed item," "users commenting on a feed item," "users replying to a feed items," "users viewing a feed items," "users deleting a group," "users creating a group," etc. A second example of the set type can be "items on which an action is performed" in the system, such as "feed items that were liked by a given user," "new feed item posted," etc. A third example of a set type can be item or entities created in the system, such as "groups created in a week," "groups created in the social network," etc. Several other examples of set types can be contemplated without departing from the scope of the present implementations.

To further define a set of events, additional qualifiers associated with the set type can be defined. For example, a group identifier and one or more time indicators can be used to further define the set of events for which the number of unique members are to be determined. In some implementations, the set definition unit 113 provides an API that enables users of the database management system 106 to define sets of events. In some implementations, the set definition unit 113 provides a graphical user interface that is displayed on the client devices 101A-N and enables the users of the database management system 106 to define the sets of events. The definition of a set of events includes selecting a set type and one or more qualifiers associated with the set type.

Once the sets of events are defined and one or more set members are stored in the set table 105, the unique event query unit 112 enables a user of the database management system to query the set table 105 and determine unique counts of events that occurred in the system during a given period.

Figure 2A:
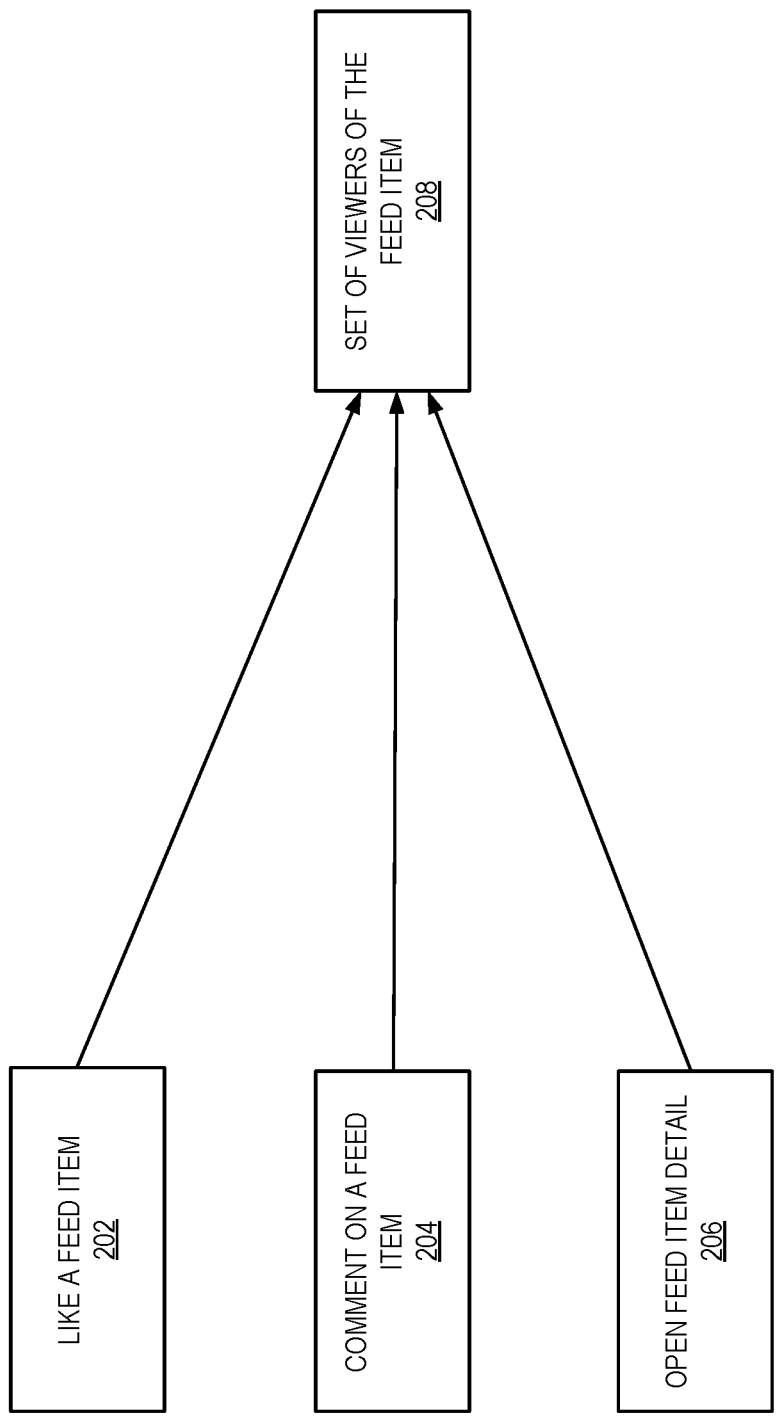
FIG. 2A illustrates exemplary events that occur in a social network feed that contribute members to a single set of events, in accordance with some implementations.
Figure 2B:
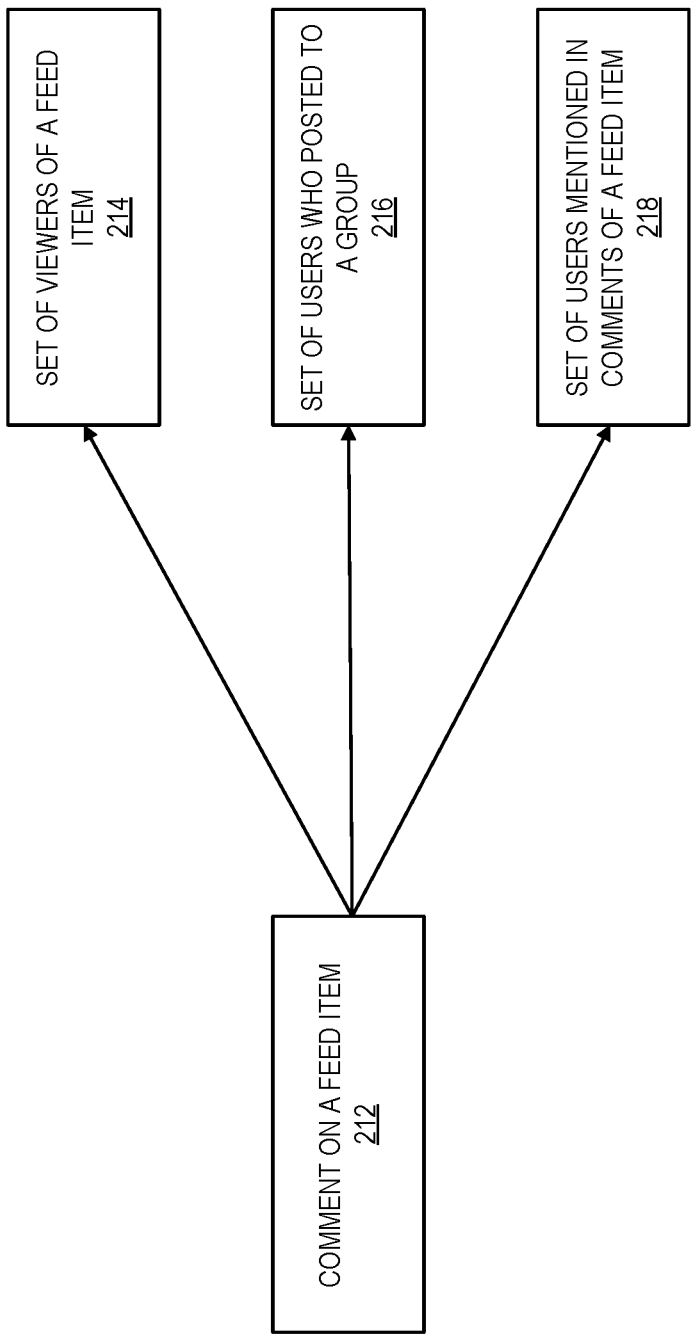
FIG. 2B illustrates an exemplary event that contributes members to multiple sets, in accordance with some implementations.

FIGS. 2A-B illustrates exemplary events and sets of events in an exemplary implementation of a social networking service. Other implementations can include different types of events and sets of events. FIG. 2A illustrates exemplary events that occur in a social network feed that contribute members to a single set of events, in accordance with some implementations. Several events that occur in the social network feed of a social networking service may contribute set members of a single set. For example, when a feed item is liked by a user (event 202), a comment is made on the feed item (event 204), or a details of the feed item are opened (206), all these events (202, 204, and 206) may contribute to the set of viewers for the feed item (set 208). Thus in this example, if a user is interested in obtaining the number of unique viewers of the feed item, the user is interested in learning whether a user has performed at least one of the following actions: liking a feed item, commenting on a feed item or opening the details of the feed item. However, in this example, the user is not interested in counting all the occurrences of these events as three separate events but instead they are interested in learning whether this particular user has viewed the feed item or not. Therefore, even if the viewer may have been the cause of three events, the set of events resulting from these events should include a single count of the three events as all indicate that the viewer has viewed the feed item. As will be described in further details below, the implementations herein enable the determination of unique counts of events in the database management system even when an event occurs several times in the system.

Additionally, a single event may contribute to multiple set of events. FIG. 2B illustrates an exemplary event that contributes members to multiple sets of events, in accordance with some implementations. For example, a comment on a feed item (event 212) can contribute to the set of viewers for a feed item (set of events 214), to the set of actions a user took for a specific day (set of events 216), as well as to the set of users mentioned in comments of a feed item (set of events 218). Thus in this example, if a user is interested in obtaining the number of unique viewers of the feed item, the number of unique actions that a user took for a specific day, and the number of unique users mentioned in a comment of a feed item, the implementation described herein enable the comment on a feed item to be counted as part of each one of these sets.

Figure 3:
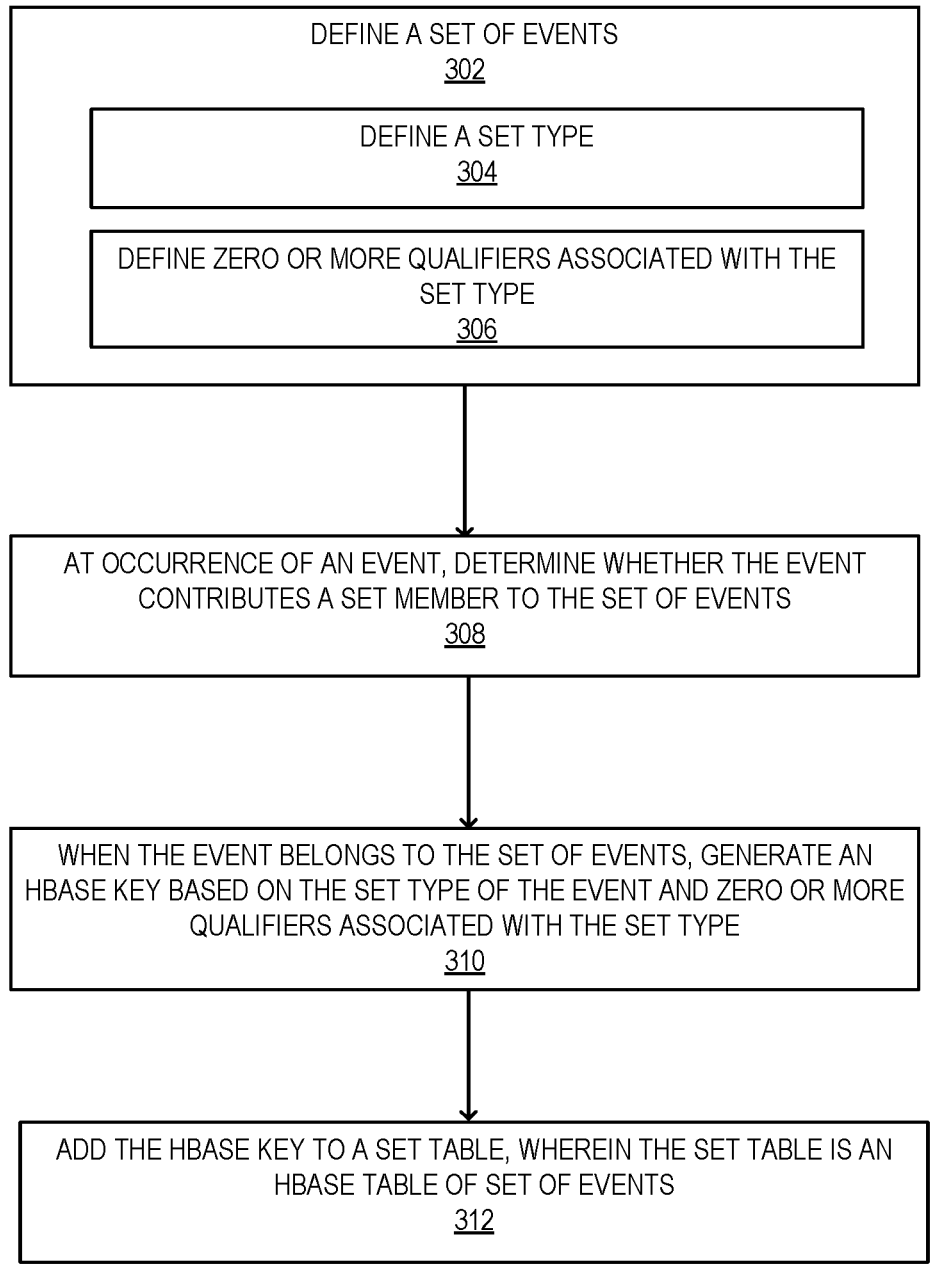
FIG. 3 illustrates a block diagram of exemplary operations for determining unique events from a stream of events in accordance with one implementation.
Figure 7:
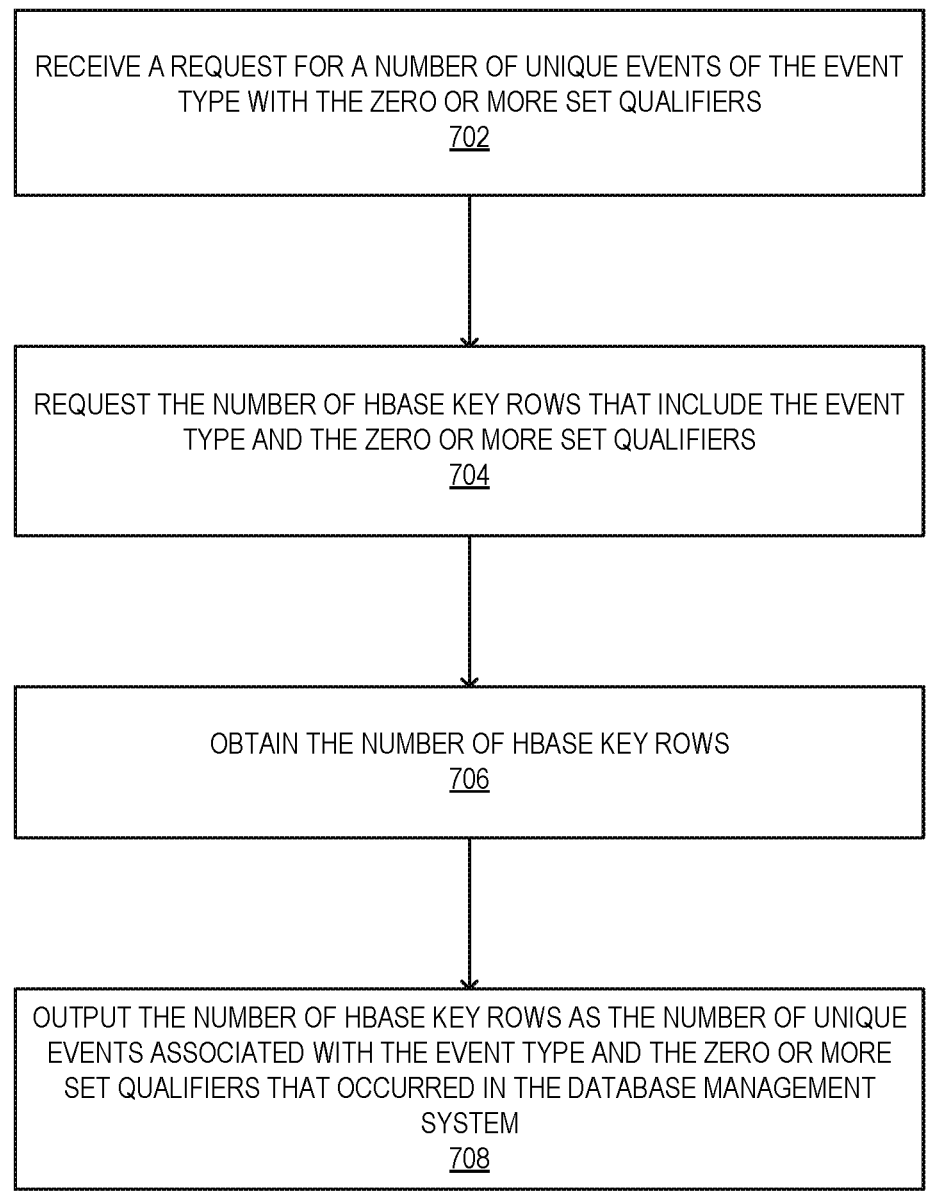
FIG. 7 illustrates a flow diagram of exemplary operations for requesting the number of unique events that occurred in a system in accordance with some implementations.

The operations in the flow diagram of FIGS. 3, 4 and 7 are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

FIG. 3 illustrates a block diagram of exemplary operations for determining unique events from a stream of events in accordance with one implementation. At operation 302, a set of events is defined. In some implementations defining a set of events includes defining a set type (operation 304), and defining zero or more qualifiers associated with the set type (operation 306).

Figure 5A:
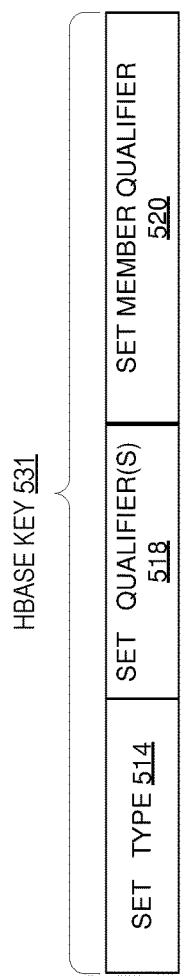
FIG. 5A illustrates an exemplary hbase key generated based on an event type, set qualifier(s) of the event, and a set member qualifier according to one implementation.

At operation 308, at occurrence of an event, it is determined whether the event contributes a set member to the set of events. At operation 310, when the event contributes a set member to the set of events, an hbase key is generated based on the set type of the event and the zero or more qualifiers associated with the set type. FIG. 5A illustrates an exemplary hbase key generated based on an event type, set qualifier(s) of the event, and a set member qualifier. In one implementation, the hbase key 531 (or hbase sorted map key) includes the set type 514, the set qualifiers 518 and the set member qualifier 520, which identify the set member. In some implementations the set of qualifiers includes 0 or more qualifiers. FIG. 5C illustrates exemplary set qualifiers 518 that may be included. A group Identifier (ID) 502 and a time indicator 504 (e.g., a time stamp indicating a time span) can be part of the set qualifiers 518. For example, when a user "Joe" comments on a feed item of a social network feed within the group "my group" an hbase key ("viewers of a feed item", "my group", "Joe") is created for this event. In some implementations several hbase keys may be generated based on the single event of the Joe commenting on a feed, based on the different set of events that are defined in the system.

Figure 5B:
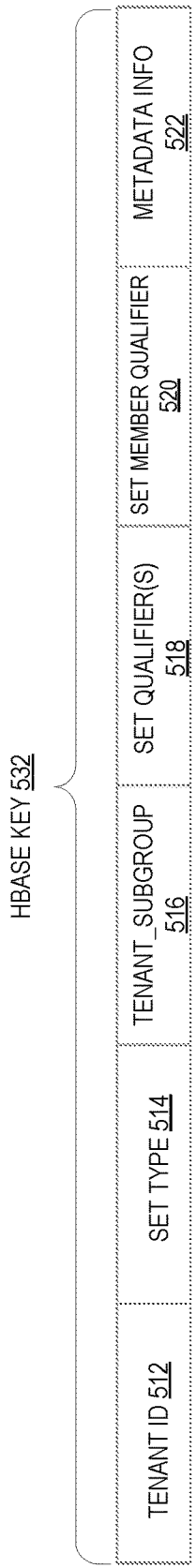
FIG. 5B illustrates another example of hbase key in accordance with one implementation.
Figure 5C:
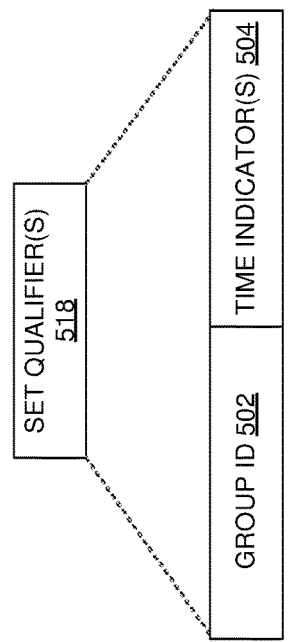
FIG. 5C illustrates exemplary set qualifiers that may be included in an hbase key in accordance with one implementation.

FIG. 5B illustrates another example of hbase key 532 in accordance with one implementation. In some implementations determining unique counts of events is implemented in a system having an application server providing a front end for an on-demand database service capable of supporting multiple tenants. In these implementations the hbase key may further include additional fields that relate to the identification of the tenant for which the set type is defined "tenant ID 512" as well as an identification of a tenant subgroup (that is a group of members within the tenant for which the set of events is defined). The key may also include metadata information 522 about the set member qualifier. For example, the metadata information 522 may be used to store the number of times that this unique set member occurred. In the example, where Joe views a feed item, which may occur multiple times, the metadata field may be used to store this number. Additional and/or other information related to the unique event can be added to the metadata information.

Referring back to FIG. 3, flow moves from operation 310 to operation 312, the hbase key is added to a set table. The set table is an hbase table of set of events. The set table includes unique occurrences of events.

Figure 4A:
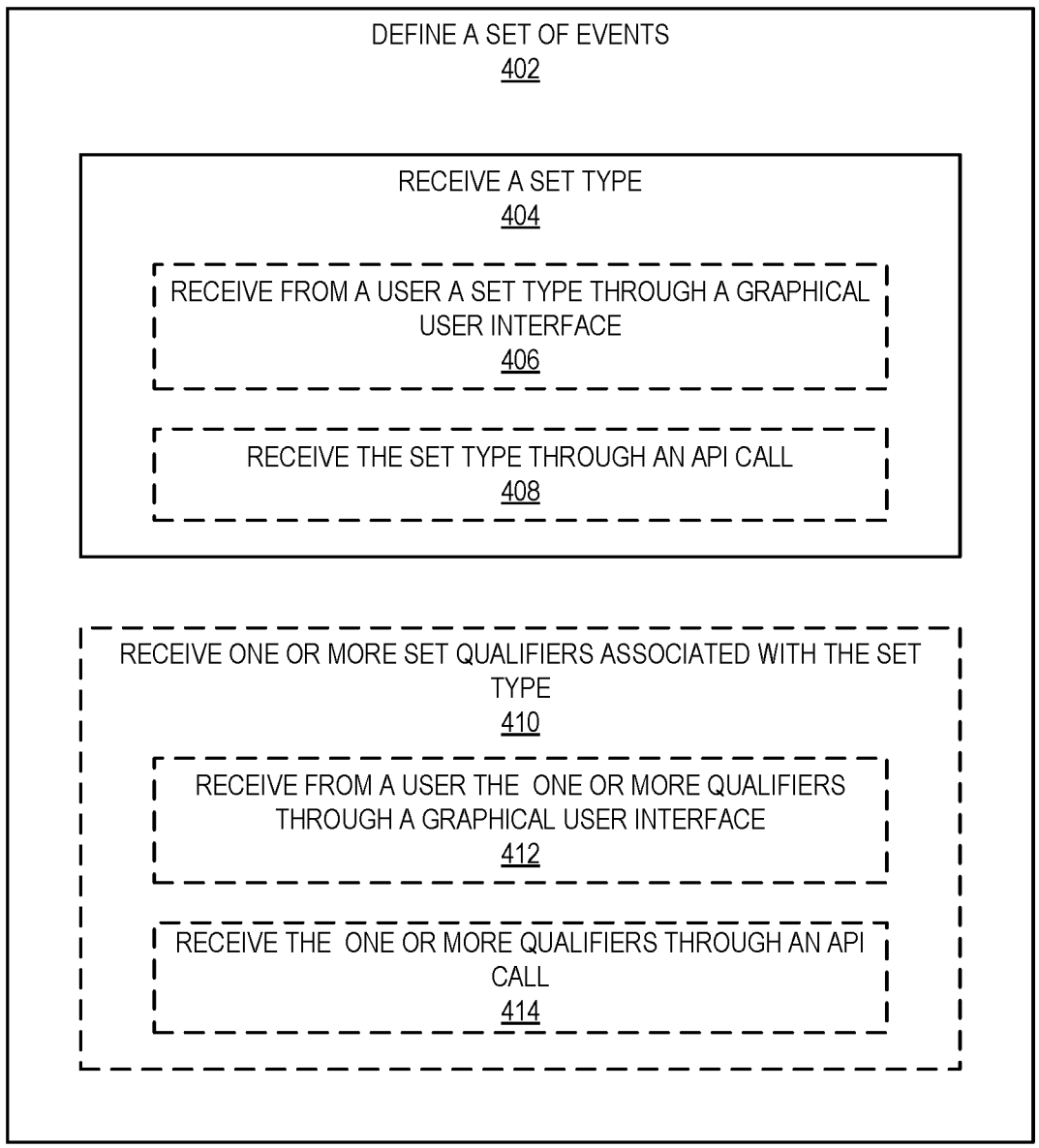
FIG. 4A illustrates a flow diagram of exemplary operations for defining a set of events in accordance with some implementations.
Figure 4B:
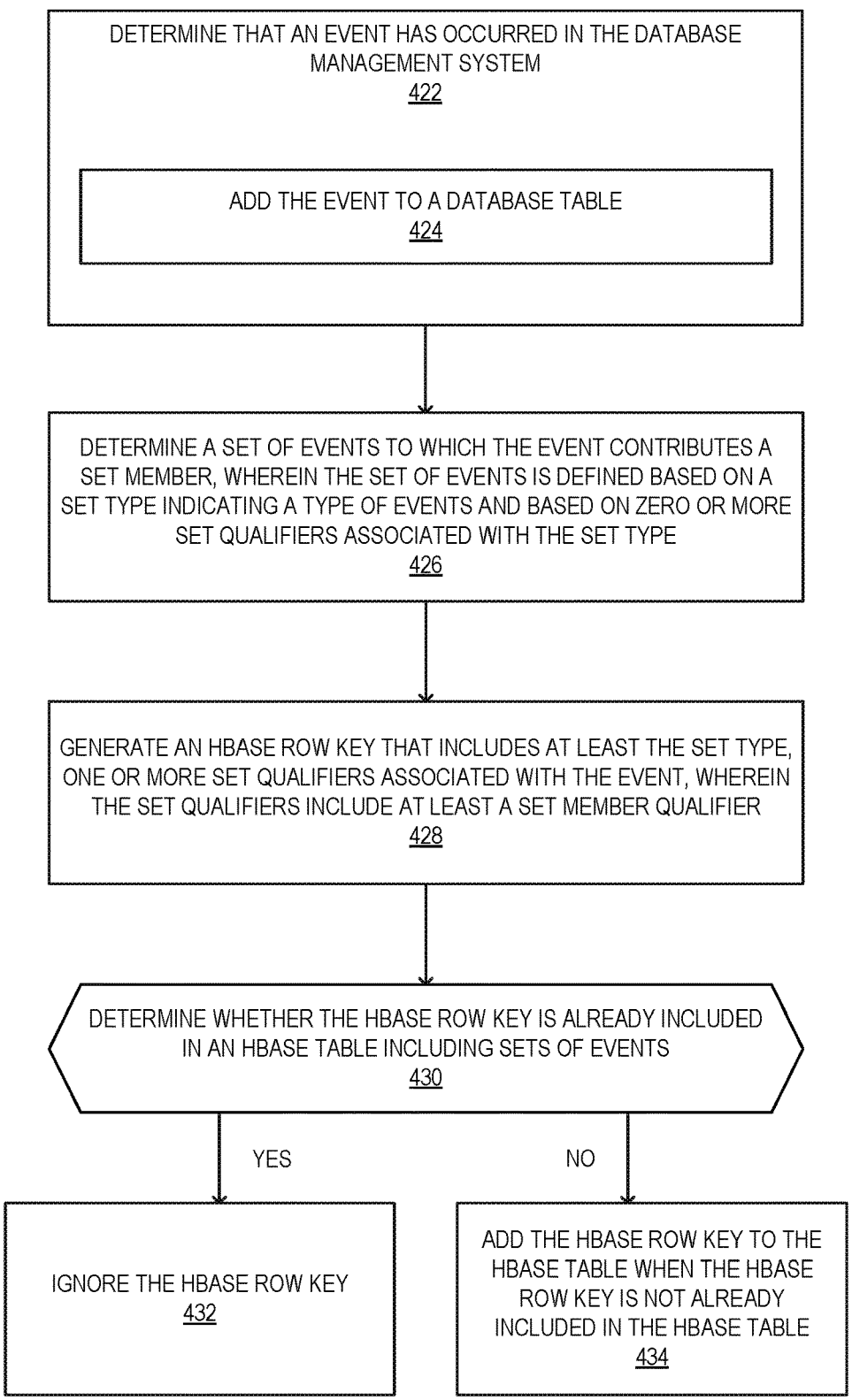
FIG. 4B illustrates a flow diagram of exemplary operations for adding a unique member of a set to the set table in accordance with some implementations.

FIGS. 4A-B and FIG. 7 illustrate flow diagrams of detailed exemplary operations for defining a set of events, updating the set of events with unique set members and requesting a count of unique events of the set according to some implementations.

FIG. 4A illustrates a flow diagram of exemplary operations for defining a set of events in accordance with some implementations. In some implementations, the operations of FIG. 4A are performed by the set definition unit 113. The set definition unit 113 is used to define a set of events by receiving, at operation 404, a set type. A set type refers to the type of events for which unique counts are to be determined. As a first example, the set type can be "users performing a given action" in the system, such as "users "liking" a feed item," "users commenting on a feed item," "users replying to a feed items," "users viewing a feed items," "users deleting a group," "users creating a group," etc. A second example of the set type can be "items on which an action is performed" in the system, such as "feed items that were liked by a given user," "new feed item posted," etc. A third example of a set type can be item or entities created in the system, such as "groups created in a week," "groups created in the social network," etc. Several other examples of set types can be contemplated without departing from the scope of the present implementations.

In some implementations, the set definition unit 113 provides a graphical user interface that is displayed on the client devices 101A-N and enables the users of the database management system 106 to define the sets of events. In these implementations, the set type is received, operation 406, from a user using the graphical user interface. In some implementation, the set definition unit 113 includes an API that enables users of the database management system 106 to define sets of events. In these implementations, the event type is received through an API call (operation 408). In some embodiments, the set of events can further be defined in a configuration code which when executed on a process configures the database management system with the set of events for which set members are to be determined.

In some implementations, only the set type is received to define the set of unique events that are to be determined. As a non-limiting example, a user may define the set as "users that view a feed item." The user does not select any additional qualifiers for the set and therefore all users that view the feed item are counted regardless of the group to which they belong, for example.

In other implementations in addition to receiving the set type, the set definition unit 113 further receives, at operation 410, one or more set qualifiers. For example, a group identifier and one or more time indicators can be used to further define the set of events for which the number of unique members are to be determined. In some implementations, several other set qualifiers can be received or automatically determined by the system. For example, in implementations where the system is capable of supporting multiple tenants, additional set qualifier can be included. For example, the additional set qualifiers can relate to the identification of the tenant for which the set type is defined, as well as an identification of a tenant subgroup (that is a group of members within the tenant for which the set of events is defined). These set qualifiers can be received from a user or alternatively automatically determined by the system based on the user's profile. If the user is associated with a given tenant and tenant subgroup, the system may use this information to automatically populate the set qualifier of a set.

In some implementations, the set definition unit 113 provides a graphical user interface that is displayed on the client devices 101A-N and enables the users of the database management system 106 to enter the set of qualifiers. In these implementations, the set qualifiers are received, operation 412, from a user using the graphical user interface. In some implementation, the set definition unit 113 includes an API that enables users of the database management system 106 to receive the set qualifiers. In these implementations, the set qualifiers are received through an API call (operation 414).

FIG. 4B illustrates a flow diagram of exemplary operations for adding a unique member of a set to the set table in accordance with some implementations. In some implementations, the operations of FIG. 4B are performed by the event ingestion unit 110. At operation 422, the event ingestion unit 110, determines that an event has occurred in the database management system. The event includes an update to data previously stored or an addition of new data. In some implementations, the determination that an event has occurred is performed by determining (operation 424) that the event is added to the relational database table 102 as part of the events 104.

Upon determining that an event occurred, the event ingestion unit 110 determines, at operation 426, a set of events to which the event belongs. The set of events is defined based on a set type indicating a type of events and based on zero or more set qualifiers associated with the set type. In some implementations, the set of events was defined as described with reference to FIG. 4A.

At operation 428, the event ingestion unit 110 generates an Hbase row key. The Hbase row key includes the set type, zero or more values of the set qualifiers associated with the event, and a unique identifier of the event. In some implementations, the event ingestion unit 110 determines the set type and the set qualifiers from the event that occurs. In some implementations a single event can contribute members to several sets and therefore more than one set type and associated set qualifiers can be determined and more than one Hbase row key can be generated for a single event.

At operation 430, the event ingestion unit 110 determines whether the Hbase row key is already included in an Hbase table including sets of events. In response to determining that the Hbase row key is already included in the Hbase table, the event ingestion unit 110 ignores, at operation 432, the event and does not add it to the Hbase table. Alternatively, in response to determining that the event is not already included in the Hbase key, the event is added, operation 434, as an Hbase row key to the Hbase table when the Hbase row key is not already included in the Hbase table.

FIG. 6 illustrates an exemplary set table in accordance with one implementation. The set table 600 includes rows (e.g., row 611A and row 612A), where each row represents a unique member of a set that was created when a corresponding event occurred in the system. For example, row 611A includes a set member from a set of type "viewers of a feed item" associated with a single qualifier "my group" and which corresponds to the set member qualifier "Joe." The row 611A is added to the hbase database when the user "Joe" views a feed item in the group "my group" for the first time. In some implementations, it may be determined that the user has viewed the feed item when the user performs one of the following operations: commenting on the feed item, viewing the details of the feed item, or other operations that relate to the feed item. Row 612A includes an event from the set of type "viewers of a feed item" associated with a single qualifier "my group" and which corresponds to the set member qualifier "Sue." The row 612A is added to the hbase database when the user "Sue" views a feed item in the group "my group" for the first time. When any of the two set member qualifiers (Sue or Joe) causes the occurrence of the event another time, the event does not cause a new set member to be not added to the set table ensuring uniqueness of the events within the set table. The two rows 611A and 612A form the set of events 601A of type "viewers of a feed item" that are further identified by the set qualifier "my group." The set 601A can be used to determine the number of unique viewers that has viewed a feed item within the group "my group".

The set table further includes row 613B that includes a set member from the set of type "viewers of a feed item" associated with a single qualifier "your group" and which is identifier by the set member qualifier "Jim." In this example, while the first row and the third row share the same set type, they differ with respect to the set qualifier associated with this set type, i.e., the group ID, and are therefore events that belong to two separate sets (i.e., the first set 601A and the second set 601B). Row 611C includes a set member from the set of type "groups created last week" associated with a single qualifier "timestamp 2" and which is identifier by the set member qualifier "cat group." In contrast to the previous set members (e.g., 611A-612A and 611B-613B) that did not have a time indicator used as a qualifier of the set of events, this row uses the time indicator 604. In some implementations, the time indicator can be a timestamp indicating a time interval. While the illustrated examples only show set types associated with a single qualifier and a set member qualifier, in other examples, a set type can be associated with no qualifiers or with two or more qualifiers.

In some implementations the determination of unique counts of events can be enabled through a service offered to clients of a database system. For example, an API may be defined to enable a client to enter parameters (e.g., set type, qualifiers of a set) to define a set of event within the database system for which unique occurrences of events are to be determined. In this implementation, once the set is defined, the service gathers set members when processing events as soon as they occur in the system.

FIG. 7 illustrates a flow diagram of exemplary operations for requesting the number of unique events that occurred in a system in accordance with some implementations. One or more sets of events can be defined. Once the sets of events are defined and one or more events are stored in the set table 105, the unique event query unit 112 enables a user of the database management system to query the set table 105 and determine unique counts of events that are comprised in each set. In some implementations, the operations of FIG. 7 are performed by the unique event query unit 112.

At operation 702, the unique event query unit 112 receives a request for a number of events of a given event type. In some implementations, the request for the number of events can be received through an SQL query for a number of unique events. The request may include the set type and the one or more set qualifiers as input parameters that define the type of events that are requested. At operation 704, the unique event query unit 704, requests the number of Hbase key rows that include the event type and the zero or more set qualifiers. Thus, the SQL query is run to obtain the number of unique events. At operation 706, the number of Hbase key rows is obtained and this number is output, operation 708, as the number of unique events associated with the event type and the zero or more set qualifiers.

FIG. 8 illustrates an exemplary query that can be used to determine the number of unique viewers of a feed item. An SQL query can be used to parse the hbase set table 600 and determine the unique number of viewers. For example, the query: SELECT COUNT(*) FROM set_table WHERE set type='viewers of a feed item' AND group ID='my group' returns "2". Thus, once the hbase table is generated dynamically when events occur in the system, simple SQL queries can be performed to efficiently and quickly obtain number of unique events.

The techniques described herein use the behavior of the hbase sorted map key to uniquify events into sets at the time these events are added to a database system. These techniques enable a very efficient query over the index portion of the sorted map key to get a count of set members at read time, instead of trying to perform uniquification of the events at read time from a relational database. The hbase key forces a unique row for each event, no matter how many times it has been inserted.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment.

In some implementations, a social network feed may be specific to a group of users of an enterprise social networking system. For instance, a group of users may publish a news feed. Members of the group may view and post to this group feed in accordance with a permissions configuration for the feed and the group. Information updates in a group context can also include changes to group status information.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

Architecture

Figure 9:
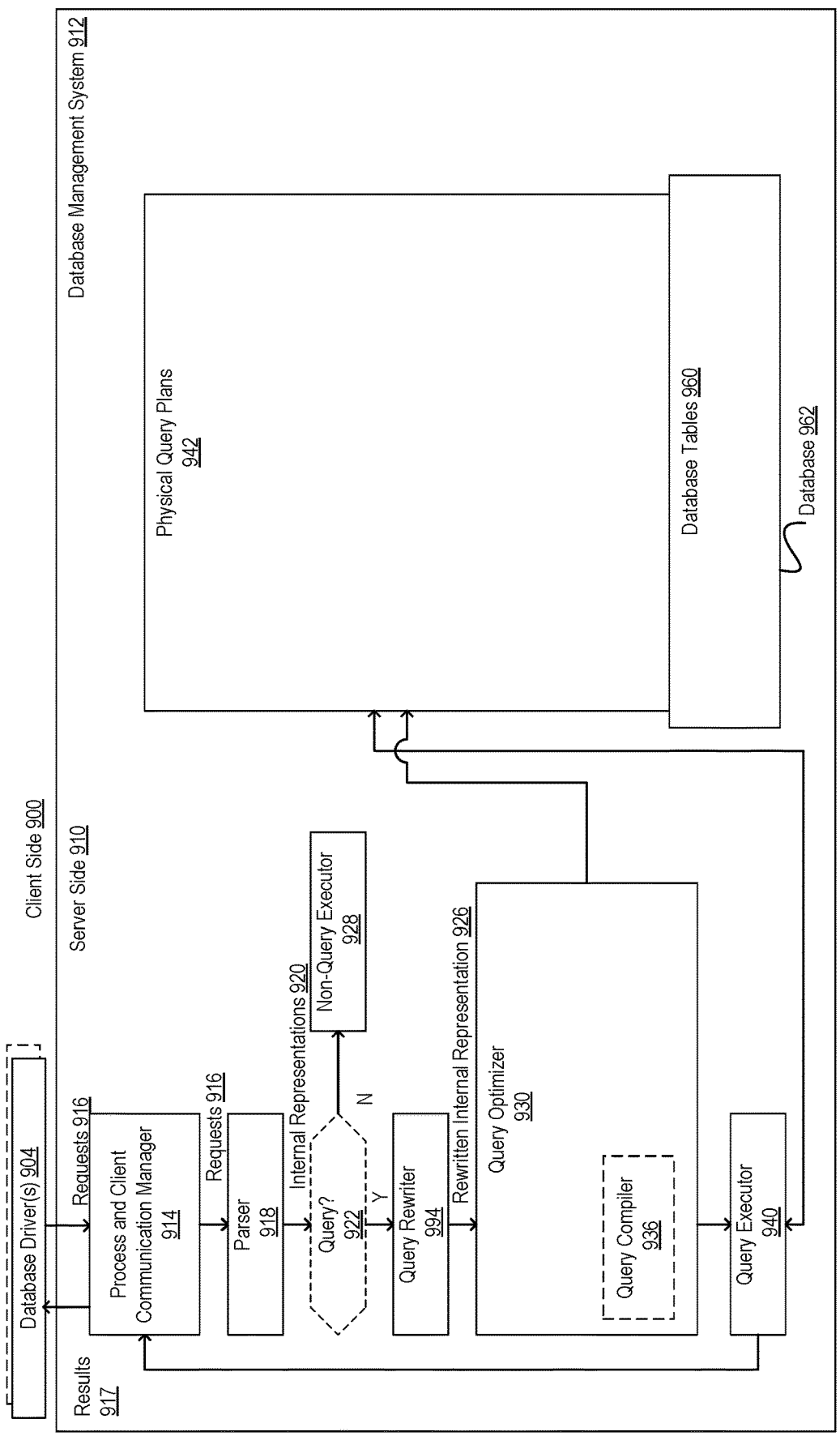
FIG. 9 is a block diagram illustrating a database management system according to one implementation.

FIG. 9 is a block diagram illustrating a data base management system according to one implementation. FIG. 9 divides into a client side 900 and a server side 910. The client side 900 includes one or more clients (not shown), each including one of the database driver(s) 904 (also known as a remote procedure call (RPC) module) as well as other components known in the art (not shown). The database management system can be used to implement the set of events The server side 910 includes the database management system (DBMS) 912. The DBMS 912 includes a database in which clients store, and from which clients retrieve, data. The DBMS 912 includes components named according to the components commonly found in DBMSs (e.g., Joseph M. Hellerstein, Michael Stonebraker, and James Hamilton, "Architecture of a Database," Foundations and Trends in Databases, Vol. 1, No. 2 (2007), pages 141-259; Joseph M. Hellerstein and Michael Stonebraker, "Anatomy of a Database," Readings in Database Systems, Fourth Edition, The MIT Press (2005), pages 42-95), such as a process and client communication manager (PCCM) 914, a parser 918, a query rewriter 924, a query optimizer 930 and a query executor 940 (also known as an executor or query plan executor). The term "query processor" refers to the combination of the parser 918, the query rewriter 924, the query optimizer 930 and the query executor 940.

The process and client communication manager 914 (which, in some implementations is made as separate managers; and is also sometimes referred to as just the process manager) may perform a variety of tasks, including: 1) establishing and storing the connection state for the client(s), responding to client requests in the form of requests 916, and returning results 917; and/or 2) encapsulating and scheduling the various tasks of the DBMS 912 (including performing admission control). Connections are established between the database driver(s) 904 of the client(s) and the process and client communication manager 914. The database driver(s) 904 submit the requests 916 to the PCCM 914.

The PCCM 914 provides the requests 916 to the parser 918. In one implementation, the tasks of the parser 918 include converting the requests 916 into internal representations 920 (e.g., abstract syntax trees (ASTs)). A decision block 922 illustrates distinguishing those of the requests 916 that are SQL queries from those that are not. Decision block 622 is dashed because this decision can be made at one or more different locations in the DBMS 912 (e.g., at its illustrated location, and/or between the query optimizer 930 and the query executor 940, and/or as part of the query executor 940). At the illustrated location, those of the internal representations 920 that were generated from the requests 916 that are SQL queries go to the query rewriter 924, while those that are not go to a non-query executor 928.

The query rewriter 924 simplifies and normalizes the internal representations 920 of the SQL queries to produce rewritten internal representations 926 (e.g., rewritten ASTs representing the structure and contents of the query strings) that are provided to the query optimizer 930. While the query rewriter 924 is illustrated as a separate component, in some implementations it is part of the parser 918 or the query optimizer 930 as in some commercial DBMSs.

The query optimizer 930 generates query plans (which may include performing query plan optimization) from the rewritten internal representations 926. In some implementations, for each of the rewritten internal representations 926, the query optimizer 930 first creates a "logical query plan" (further described later herein) prior to creating a "physical query plan" (also known as "fully specified query plan") in physical query plans 942. Different implementations may generate logical query plan in different ways, including those that are well known in the art (e.g., Van den Bussche, J., Vansummeren, S., Translating SQL into the Relational Algebra, available at https://cs.ulb.ac.be/publia_media/teaching/infoh417/sql2alg_eng.pdf, retrieved October 2016; Kifer, M. et al, Database Systems: Application Oriented Approach, Complete Version—2nd edition, ISBN-13: 978-0361268457, Mar. 26, 2005). For example, in one implementation a logical query plan is created from a rewritten internal representation by walking the AST and creating nodes from the AST which correspond to query plan operators (e.g., PROJECT for a "select" statement, JOIN or SELECT for a "where" clause, etc.).

The query executor 940 executes the physical query plans 942 corresponding to the SQL queries, which includes accessing the specified data from the specified database tables in the database 962, performing the query plan operations specified by those physical query plans, and providing the results to the process and client communication manager 914; which in turn provides those results (shown as results 917) to the respective ones of the clients that submitted the respective SQL queries.

Each of the physical query plans 942 comprises a directed graph of nodes connected by edges, wherein each of the directed graphs represents an ordered set of query plan operators that when executed provides the query result for an SQL query.

In one implementation, the query optimizer 930 includes a query compiler 936 that compiles the query plan into machine code or an interpretable query plan (to enable cross platform portability and which may be lightweight (e.g., an annotated relational algebra expression) or in a lower level language (e.g., Java byte codes)).

Each of the nodes of the directed graphs in the physical query plans 942 represents one of the query plan operators of the physical query plans 942. The nodes of the physical query plans 942 may be referred to as "nodes" or "physical query plan nodes" (PQPNs).

The non-query executor 928 may execute an INSERT operation (i.e., insert one or more data records in a table of the database), UPDATE operation (i.e., change the contents of one or more data records in tables of the database), DELETE operation (i.e., delete one or more data records in one or more tables of the database), and optionally other operations that modify the contents of a table; as well as executes at least CREATE TABLE, and optionally other Data Definition Language (DDL) operations that don't change the content of tables, but the tables themselves (e.g., the schema).

In one implementation, operation of the DBMS 912 begins with no query plans (logical or physical). Responsive to one or more CREATE TABLE statements in requests 916, the DBMS 912 creates a table. Responsive to a first SQL query being received, the DBMS 912 generates and executes a first physical query plan, and returns a query result to the client that submitted the first SQL query.

The arrowed lines between the PCCM 914, parser 918, query rewriter 924, query optimizer 930, query executor 940, and non-query executor 928 in FIG. 9 represent some type of coupling, such as data flow and/or connectivity. For instance, in some implementations the PCCM 914 calls each of the parser 918, query rewriter 924, query optimizer 930, query executor 940, and non-query executor 928 to coordinate the executing of the SQL statements 916, and thus the arrowed lines represent an order as opposed to, for example, the parser 918 calling the query rewriter 924.

Figure 10:
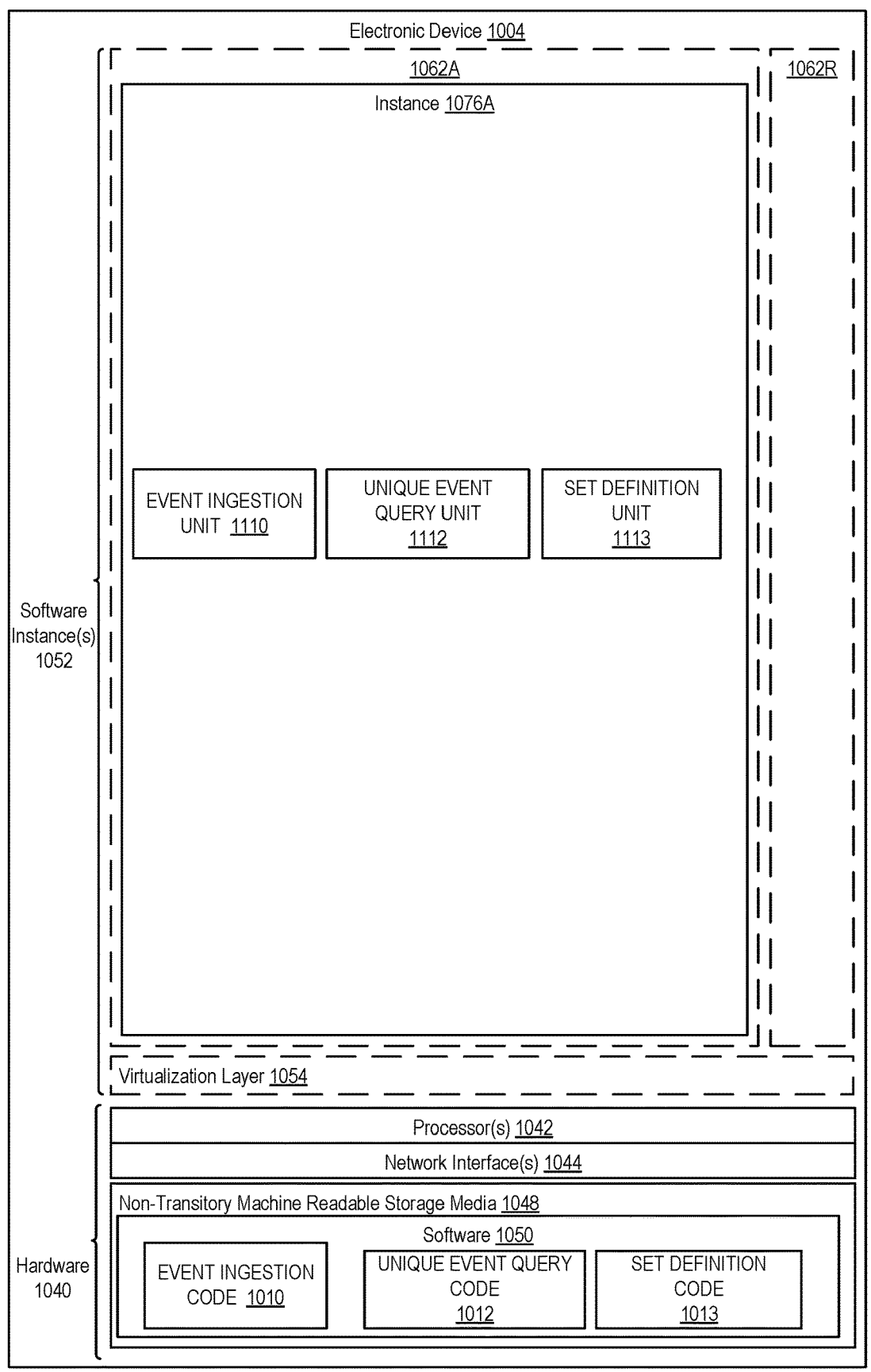
FIG. 10 illustrates a block diagram of an electronic device in accordance with one implementation.

FIG. 10 illustrates an electronic device 1004 according to one implementation. FIG. 10 includes hardware 1040 comprising a set of one or more processor(s) 1042, a set or one or more network interfaces 1044 (wireless and/or wired), and non-transitory machine-readable storage media 1048 having stored therein software 1050. Each of the previously described end user clients, the service described with reference to FIGS. 1-8, and the DBMS 912 may be implemented in one or more electronic devices 1004. In one implementation, each of the end user clients is implemented in a separate one of the electronic devices 1004 (e.g., in an end user electronic device operated by an end user; in which case, the software 1050 in each such end user electronic device includes the software to implement one of the end user clients); in operation, the end user electronic devices and the electronic device(s) implementing the DBMS 912 would be commutatively coupled (e.g., by a network) and would establish between them (or through one or more other layers) connections for submitting queries to the DBMS 912. Other configurations of electronic devices may be used in other implementations.

In electronic devices that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1050 (illustrated as instance 1076A) is executed within the software container 1062A on the virtualization layer 1054. In electronic devices where compute virtualization is not used, the instance 1076A on top of a host operating system is executed on the "bare metal" electronic device 1004. The instantiation of the instance 1076A, as well as the virtualization layer 1054 and software containers 1062A-R if implemented, are collectively referred to as software instance(s) 1052.

In some implementations, the software 1050 includes event ingestion code 1010, unique event query code 1012, and set definition code 1013, which when executed by the processor(s) 1042 cause the electronic device 1004 to instantiate an event ingestion unit 1110, a unique event query unit 1112, and a set definition unit 1113 respectively.

Alternative implementations of an electronic device may have numerous variations from that described above. For example, customized hardware and/or accelerators might also be used in an electronic device.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the exemplary implementations may include an on-demand database service environment provided by an application server with a front end for an on-demand database service capable of supporting multiple tenants, alternative implementations are within the spirit and scope of the appended claims (e.g., other database architectures may be used, such as ORACLE® or DB2® by IBM).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method in a database management system, the method comprising:
   upon determining that an event has occurred in the database management system, performing the following:
      determining a set of events to which the event contributes a set member, wherein the set of events is defined based on a set type indicating a type of events and based on zero or more set qualifiers associated with the set type;
      generating an Hbase row key that includes at least the set type, one or more set qualifiers associated with the event, wherein the set qualifiers include at least a set member qualifier;
      determining whether the Hbase row key is already included in an Hbase table including sets of events; and
      adding the Hbase row key to the Hbase table when the Hbase row key is not already included in the Hbase table.

2. The method of claim 1, wherein the set of events is a first set of events, the set type is a first set type and the set qualifiers are first set qualifiers, and the method further comprises:
   determining a second set of events to which the event further contributes a set member, wherein the second set of events is defined based on a second set type and based on zero or more second set qualifiers and at least one of the second set type and the second set qualifiers are different from the first set type and the first set qualifiers;
   generating a second Hbase row key that includes at least the second set type and one or more second set qualifiers associated with the event, wherein the second set qualifiers include at least a second set member qualifier;
   determining whether the second Hbase row key is already included in the Hbase table; and
   adding the second Hbase row key to the Hbase table when the second Hbase row key is not already included in the Hbase table.

3. The method of claim 1 further comprising:
   receiving a request for a number of unique events of the event type with the zero or more set qualifiers;
   requesting a number of Hbase key rows that include the event type and the zero or more set qualifiers; and
   obtaining the number of Hbase key rows; and
   outputting the number of Hbase key rows as the number of unique events associated with the event type and the zero or more set qualifiers that occurred in the database management system.

4. The method of claim 1, wherein the set qualifiers include at least one of a group identifier, a tenant identifier, a subgroup tenant identifier, a user identifier, and a time indicator.

5. The method of claim 1, wherein the set member qualifier is at least one of a user identifier and a group identifier.

6. The method of claim 1 further comprising receiving from a user of the database management system the set type and the zero or more set qualifiers for defining the set of events for which unique counts of events are to be determined.

7. A database management system comprising:
a processor; and
one or more stored sequences of instructions which, when executed by the processor, cause the processor to carry out the operations of:
upon determining that an event has occurred in the database management system, performing the following:
determining a set of events to which the event contributes a set member, wherein the set of events is defined based on a set type indicating a type of events and based on zero or more set qualifiers associated with the set type;
generating an Hbase row key that includes at least the set type, one or more set qualifiers associated with the event, wherein the set qualifiers include at least a set member qualifier;
determining whether the Hbase row key is already included in an Hbase table including sets of events; and
adding the Hbase row key to the Hbase table when the Hbase row key is not already included in the Hbase table.

8. The database management system of claim 7, wherein the set of events is a first set of events, the set type is a first set type and the set qualifiers are first set qualifiers, and the processor is further to carry out the operations of:
determining a second set of events to which the event further contributes a set member, wherein the second set of events is defined based on a second set type and based on zero or more second set qualifiers and at least one of the second set type and the second set qualifiers are different from the first set type and the first set qualifiers;
generating a second Hbase row key that includes at least the second set type and one or more second set qualifiers associated with the event, wherein the second set qualifiers include at least a second set member qualifier;
determining whether the second Hbase row key is already included in the Hbase table; and
adding the second Hbase row key to the Hbase table when the second Hbase row key is not already included in the Hbase table.

9. The database management system of claim 7, wherein the processor is further to carry out the operations of:
receiving a request for a number of unique events of the event type with the zero or more set qualifiers;
requesting a number of Hbase key rows that include the event type and the zero or more set qualifiers; and
obtaining the number of Hbase key rows; and
outputting the number of Hbase key rows as the number of unique events associated with the event type and the zero or more set qualifiers that occurred in the database management system.

10. The database management system of claim 7, wherein the set qualifiers include at least one of a group identifier, a tenant identifier, a subgroup tenant identifier, a user identifier, and a time indicator.

11. The database management system of claim 7, wherein the set member qualifier is at least one of a user identifier and a group identifier.

12. The database management system of claim 7, wherein the processor is further to receive from a user of the database management system the set type and the zero or more set qualifiers for defining the set of events for which unique counts of events are to be determined.

13. A non-transitory computer readable storage medium storing code, which when executed by a processor causes the processor to perform the following operations for determining unique events from a stream of events, the operations comprising:
upon determining that an event has occurred in a database management system, performing the following:
determining a set of events to which the event contributes a set member, wherein the set of events is defined based on a set type indicating a type of events and based on zero or more set qualifiers associated with the set type;
generating an Hbase row key that includes at least the set type, one or more set qualifiers associated with the event, wherein the set qualifiers include at least a set member qualifier;
determining whether the Hbase row key is already included in an Hbase table including sets of events; and
adding the Hbase row key to the Hbase table when the Hbase row key is not already included in the Hbase table.

14. The non-transitory computer readable storage medium of claim 13, wherein the set of events is a first set of events, the set type is a first set type and the set qualifiers are first set qualifiers, and the operations further comprise:
determining a second set of events to which the event further contributes a set member, wherein the second set of events is defined based on a second set type and based on zero or more second set qualifiers and at least one of the second set type and the second set qualifiers are different from the first set type and the first set qualifiers;
generating a second Hbase row key that includes at least the second set type and one or more second set qualifiers associated with the event, wherein the second set qualifiers include at least a second set member qualifier;
determining whether the second Hbase row key is already included in the Hbase table; and
adding the second Hbase row key to the Hbase table when the second Hbase row key is not already included in the Hbase table.

15. The non-transitory computer readable storage medium of claim 13, wherein the operations further comprise:
receiving a request for a number of unique events of the event type with the zero or more set qualifiers;
requesting a number of Hbase key rows that include the event type and the zero or more set qualifiers; and
obtaining the number of Hbase key rows; and
outputting the number of Hbase key rows as the number of unique events associated with the event type and the zero or more set qualifiers that occurred in the database management system.

16. The non-transitory computer readable storage medium of claim 13, wherein the set qualifiers include at least one of a group identifier, a tenant identifier, a subgroup tenant identifier, a user identifier, and a time indicator.

17. The non-transitory computer readable storage medium of claim 13, wherein the set member qualifier is at least one of a user identifier and a group identifier.

18. The non-transitory computer readable storage medium of claim 13, wherein the operations further comprise receiving from a user of the database management system the set type and the zero or more set qualifiers for defining the set of events for which unique counts of events are to be determined.

\* \* \* \* \*